US008837020B2

(12) United States Patent
Horiguchi

(10) Patent No.: US 8,837,020 B2
(45) Date of Patent: *Sep. 16, 2014

(54) IMAGE READING APPARATUS AND IMAGE FORMING APPARATUS PROVIDED WITH SAME

(71) Applicant: Kyocera Document Solutions Inc., Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,858

(22) Filed: May 30, 2013

(65) Prior Publication Data

US 2013/0321882 A1 Dec. 5, 2013

(30) Foreign Application Priority Data

May 31, 2012 (JP) ................................. 2012-124423

(51) Int. Cl.
*H04N 1/04* (2006.01)
*H04N 1/00* (2006.01)
*G03G 15/00* (2006.01)

(52) U.S. Cl.
CPC ......... *H04N 1/00591* (2013.01); *G03G 15/602* (2013.01); *H04N 1/00278* (2013.01); *H04N 1/00* (2013.01)
USPC ........... 358/498; 358/474; 358/497; 358/496; 399/361; 399/407; 271/227; 271/145

(58) Field of Classification Search
CPC ............ H04N 1/0057; H04N 1/00572; H04N 1/0058; H04N 1/00591; H04N 1/0062; H04N 1/00734; H04N 1/00745; H04N 2201/044; H04N 1/00612; H04N 1/00652; H04N 1/00689; H04N 1/00705; H04N 1/00774
USPC .............. 271/227, 225, 145, 226, 109, 10.11, 271/10.12, 114, 118, 162, 242, 263, 264, 271/3.15; 399/17, 23, 361, 374, 407, 69, 399/82, 88, 92; 358/498, 474, 1.13, 497, 358/1.2, 449, 461, 482

See application file for complete search history.

(56) References Cited

U.S. PATENT DOCUMENTS 5,168,301 A * 12/1992 Akisada et al. ................. 355/27
5,983,064 A * 11/1999 Green et al. ................... 399/341

(Continued)

FOREIGN PATENT DOCUMENTS

JP 2007-221646 8/2007
JP 2009094965 4/2009

OTHER PUBLICATIONS

European Search Report.

*Primary Examiner* — Negussie Worku
(74) *Attorney, Agent, or Firm* — Gerald E. Hespos; Michael J. Porco; Matthew T. Hespos

(57) ABSTRACT

An image reading apparatus includes a first housing, a second housing, a document conveyance path, a transparent member, a guide member, a transparent sheet member and a first pressing member. The second housing is openable and closable with respect to the first housing. The document conveyance path is arranged in the second housing and conveys a document passing through a first position. The guide member is arranged on the transparent member at a side downstream of the first position. The transparent sheet member is arranged on the transparent member to cover the first position. The first pressing member is arranged to cover a part of the transparent sheet member upstream of the first position from above and presses the transparent sheet member. An end portion of the first pressing member is arranged inwardly of an end portion of the transparent sheet member in the main scanning direction.

18 Claims, 11 Drawing Sheets

(56) References Cited

U.S. PATENT DOCUMENTS

| | | | |
|---|---|---|---|
| 6,236,815 B1 * | 5/2001 | Kaneko et al. | 399/45 |
| 6,329,023 B2 * | 12/2001 | Tokisue et al. | 427/489 |
| 7,468,817 B2 * | 12/2008 | Obana et al. | 358/474 |
| 7,547,496 B2 * | 6/2009 | Asano et al. | 430/45.1 |
| 7,804,627 B2 * | 9/2010 | Horiguchi | 358/488 |
| 8,041,254 B2 * | 10/2011 | Ito | 399/110 |
| 8,194,294 B2 * | 6/2012 | Tagawa et al. | 358/475 |
| 8,298,735 B2 * | 10/2012 | Kurachi et al. | 430/66 |
| 8,325,392 B2 * | 12/2012 | Tagawa et al. | 358/475 |
| 8,557,486 B2 * | 10/2013 | Ishida et al. | 430/66 |
| 2004/0004320 A1 | 1/2004 | Watanabe | |
| 2007/0145662 A1 | 6/2007 | Yamada | |
| 2010/0245950 A1 | 9/2010 | Osakabe | |

* cited by examiner

IMAGE READING APPARATUS AND IMAGE FORMING APPARATUS PROVIDED WITH SAME

This application is based on Japanese Patent Application Serial No. 2012-124423 filed with the Japan Patent Office on May 31, 2012, the contents of which are hereby incorporated by reference.

BACKGROUND

The present disclosure relates to an image reading apparatus for reading a document image and an image forming apparatus provided with the same.

Two methods, i.e. a fixed document reading method and a conveyance document reading method are known as a reading method of image reading apparatuses. In the fixed document reading method, a document is placed on a contact glass and pressed against the contact glass by a platen mat, a document conveying device or the like and has a document image read by being scanned by a reading unit. On the other hand, in the conveyance document reading method, a reading unit is fixed at a predetermined position and a document image is read while a document is conveyed above the reading unit.

In the conveyance document reading method, a document discharge guide is arranged downstream of a document reading position to separate a document conveyed to the document reading position from the contact glass. If the contact glass is composed of a contact glass for fixed document reading and a contact glass for conveyance document reading, a base end part of the document discharge guide is arranged below the contact glass for conveyance document reading utilizing a space between the two contact glasses. On the other hand, if the contact glass is composed of a single contact glass, the document discharge guide is arranged on the contact glass. In this case, there occurs a problem that the leading end of a document being conveyed collides with the document discharge guide. To solve such a problem, there has been conventionally a technology for providing a transparent sheet member between a contact glass and a document being conveyed and reading an image via the transparent sheet member and the contact glass. To suppress the formation of a clearance between the transparent sheet member and the contact glass and the resultant formation of interference fringes in a read image, a biasing member for biasing the document toward the contact glass with the transparent sheet member sandwiched therebetween is arranged upstream of a reading position. In the above technology, the document passes through a document reading position while rubbing the transparent sheet member. Thus, a document conveying surface side of the transparent sheet member is scratched.

SUMMARY

An image reading apparatus according to one aspect of the present disclosure includes a first housing, a second housing, a document conveyance path, a plate-like transparent member, a reading unit, a guide member, a transparent sheet member and a first pressing member. The second housing is openable and closable with respect to the first housing. The document conveyance path is arranged in the second housing and conveys a document so that the document passes through a first position on the first housing facing the second housing in a closed state. The plate-like transparent member is arranged in the first housing to face the second housing in such a manner as to include the first position and a second position which is adjacent to the first position and where a fixed document is placed on the upper surface of the transparent member with a document surface faced down. The reading unit extends in a main scanning direction intersecting with a conveying direction of the document in the first housing, is movable in a sub scanning direction along the conveying direction of the document and reads an image of the document or the fixed document through the transparent member at the first position and the second position. The guide member is arranged on the transparent member at a side downstream of the first position in the conveying direction of the document and guides the document to a downstream side of the document conveyance path in the conveying direction. The transparent sheet member is arranged on the transparent member to cover the first position from an upstream side to a downstream side in the conveying direction. The first pressing member is arranged to cover a part of the transparent sheet member upstream of the first position in the conveying direction from above and presses the transparent sheet member toward the transparent member. An end portion of the first pressing member is arranged inwardly of an end portion of the transparent sheet member in the main scanning direction.

Further, an image forming apparatus according to another aspect of the present disclosure includes the image reading apparatus and an image forming station. The image forming station forms an image on a sheet based on an image read by the image reading apparatus.

These and other objects, features and advantages of the present disclosure will become more apparent upon reading the following detailed description along with the accompanying drawings.

DETAILED DESCRIPTION

Figure 1:
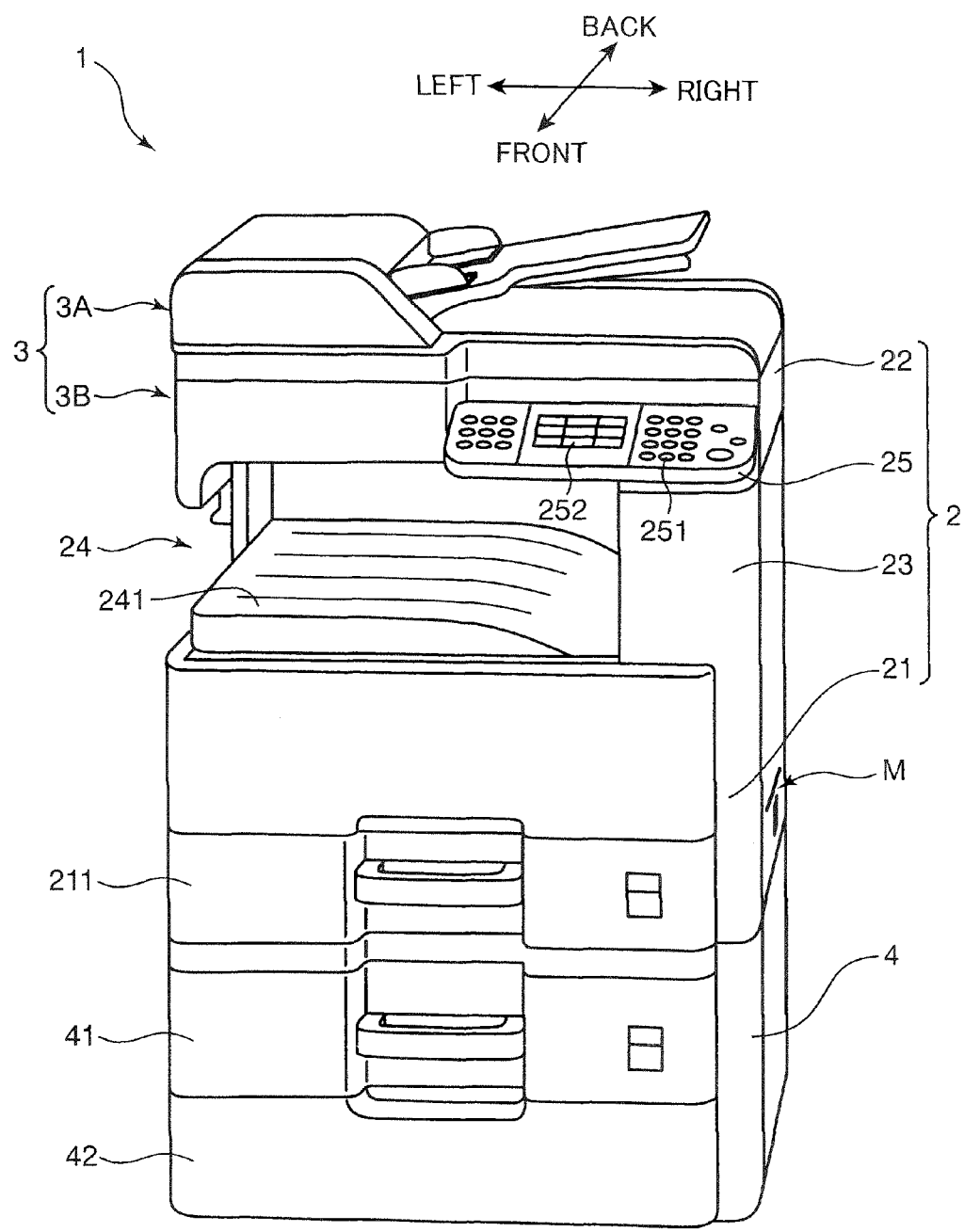
FIG. 1 is a perspective view of an image forming apparatus according to one embodiment of the present disclosure.
Figure 2:
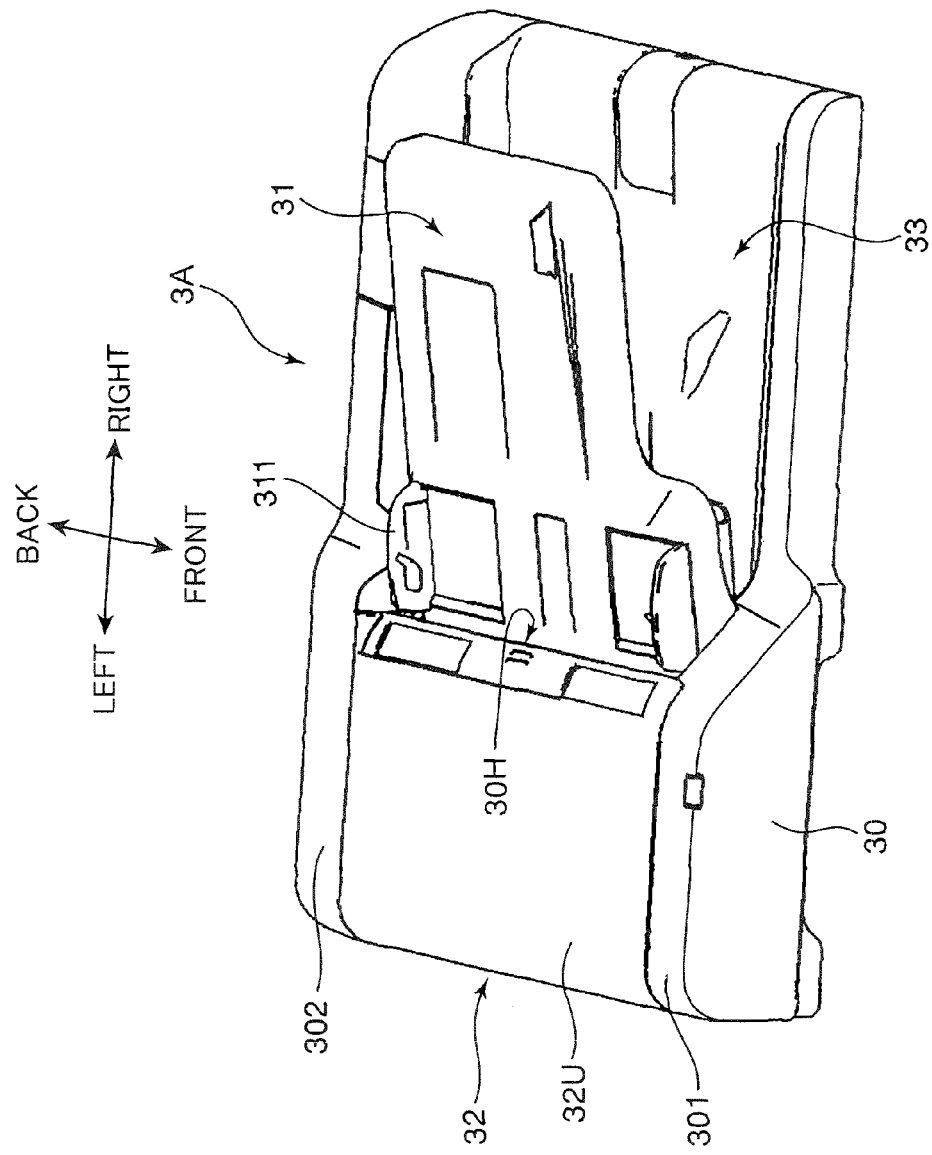
FIG. 2 is a perspective view of an automatic document feeder according to the one embodiment of the present disclosure.
Figure 3:
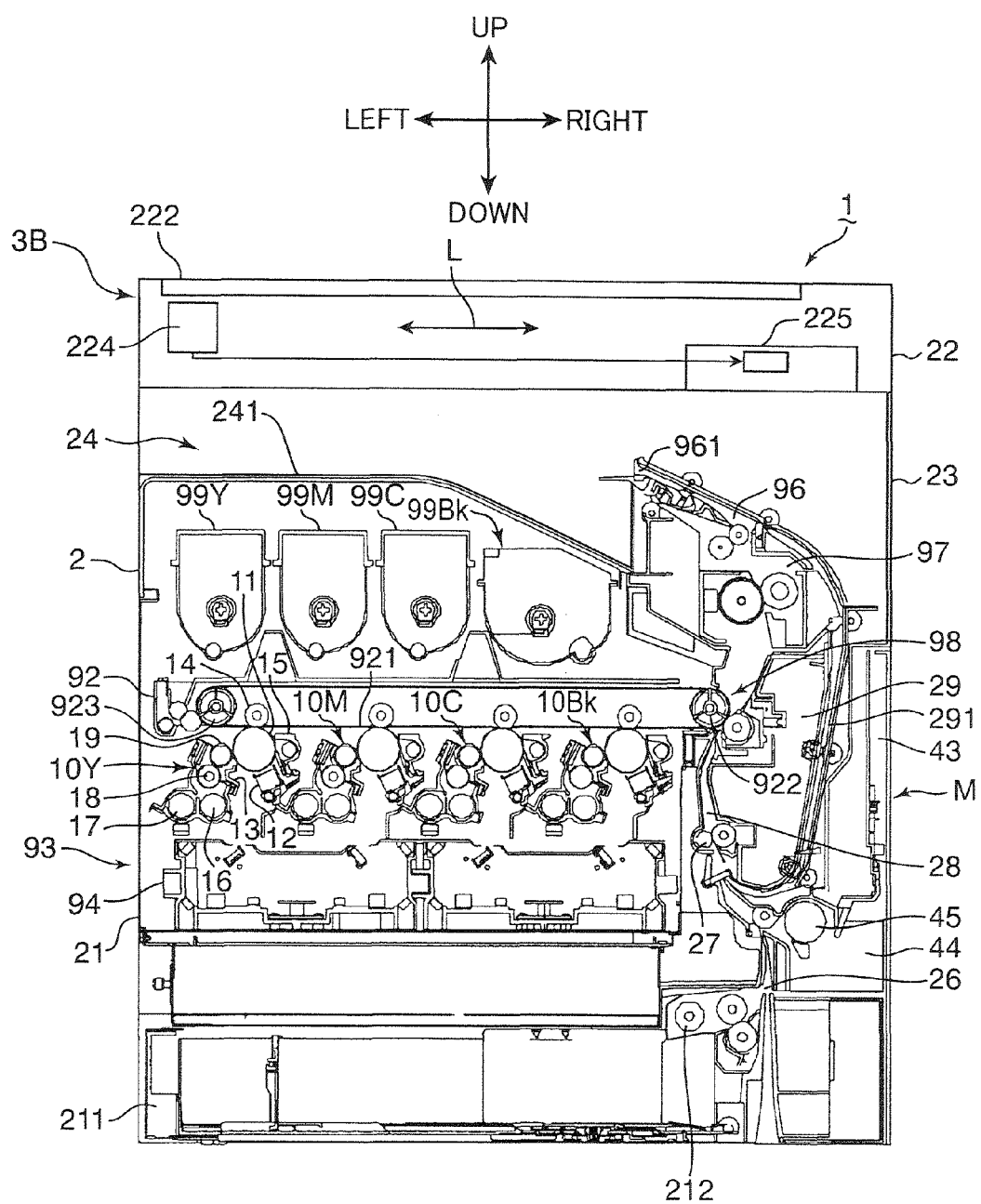
FIG. 3 is a sectional view showing the internal structure of the image forming apparatus according to the one embodiment of the present disclosure.
Figure 4:
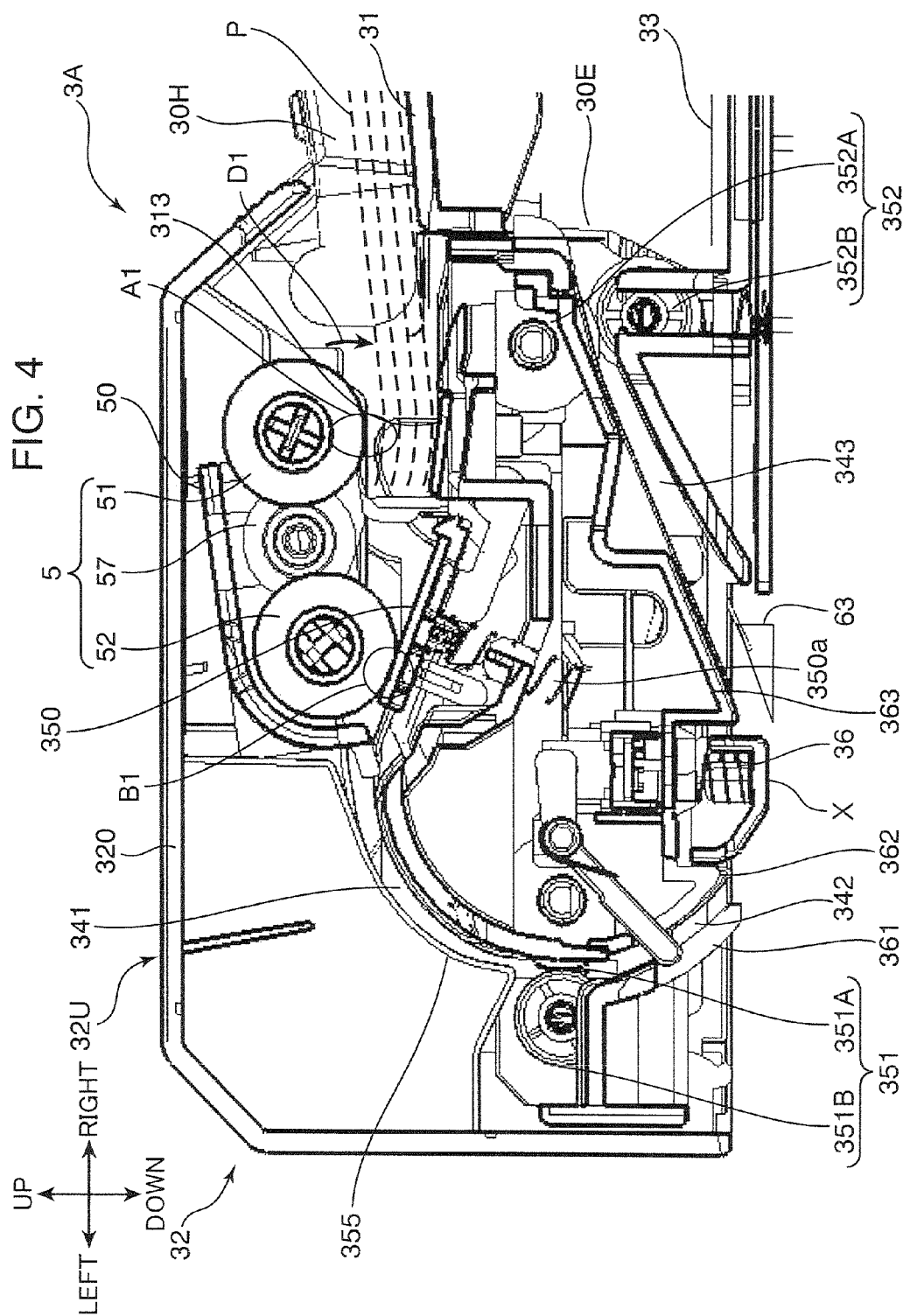
FIG. 4 is a sectional view of a document conveying unit which is an essential part of the automatic document feeder according to the one embodiment of the present disclosure.

Hereinafter, an embodiment of the present disclosure is described with reference to the drawings. FIG. 1 is a perspective view showing the external appearance of an image forming apparatus 1 provided with an image reading apparatus 3 according to one embodiment of the present disclosure, FIG. 2 is a perspective view showing the external apparatus of an automatic document feeder 3A and FIG. 3 is a sectional view showing the internal structure of the image forming apparatus 1. FIG. 4 is a sectional view of a document conveying unit 32 which is an essential part of the automatic document feeder 3A. Although an internal discharge type copier is illustrated as the image forming apparatus 1 here, the image forming apparatus may be a printer, a facsimile machine or a complex machine provided with these functions.

The image forming apparatus 1 includes an apparatus main body 2 having a substantially rectangular parallelepipedic housing structure and including an internal space, the automatic document feeder 3A (second housing) arranged on the upper surface of the apparatus main body 2 and an extended sheet feeding unit 4 assembled in a lower side of the apparatus main body 2.

The apparatus main body 2 performs an image forming process on a sheet. The apparatus main body 2 includes a substantially rectangular parallelepipedic lower housing 21, a substantially rectangular parallelepipedic upper housing 22 (first housing) arranged above the lower housing 21, and a coupling housing 23 coupling the lower housing 21 and the upper housing 22. Various devices for image formation are housed in the lower housing 21. An image reading unit 3B for optically reading a document image is housed in the upper housing 22. The image reading apparatus 3 includes the automatic document feeder 3A and the image reading unit 3B. The internal space enclosed by the lower housing 21, the upper housing 22 and the coupling housing 23 serves as an internal sheet discharge portion 24 capable of storing a sheet after image formation. The coupling housing 23 is arranged on the right surface side of the apparatus main body 2 and includes a discharge opening 961 (FIG. 3) through which a sheet is discharged to the internal sheet discharge portion 24.

The internal space used as the internal sheet discharge portion 24 is open to the outside on the front and left surfaces of the apparatus main body 2. A user can insert his hand through these open parts and take out a sheet after image formation from the internal sheet discharge portion 24. A bottom surface 241 of the internal space is defined by the upper surface of the lower housing 21 and sheets discharged through the discharge opening 961 are stacked thereon.

An operation panel unit 25 projects from the front surface of the upper housing 22. The operation panel unit 25 is provided with operation keys 251 including a numerical keypad and a start key, an LCD touch panel 252 and the like, and receives the input of various operation instructions from the user. The user can enter the number of sheets to be printed, print density and the like through the operation panel unit 25.

A sheet feeding device 211 for storing recording sheets to which the image forming process is to be applied is mounted in the lower housing 21. The extended sheet feeding unit 4 also includes sheet feeding devices 41, 42 for storing recording sheets to which the image forming process is to be applied. These sheet feeding devices 211, 41 and 42 are devices provided for automatic sheet feeding and a large number of recording sheets can be individually stored according to sizes. Note that only the sheet feeding device 211 of the lower housing 21 is drawn in FIG. 3.

A multi-tray unit M which can be opened and closed to enable the user to perform manual feeding is attached to the right side surface of the apparatus main body 2. The multi-tray unit M includes a sheet feed tray 43 on which a recording sheet to be manually fed is to be placed and a sheet feeding unit 44 for carrying the recording sheet into an image forming station in the lower housing 21.

The automatic document feeder 3A is rotatably mounted on the rear side of the upper surface of the upper housing 22 of the apparatus main body 2. In other words, the automatic document feeder 3A is openable and closable with respect to the upper housing 22 of the apparatus main body 2. Note that this automatic document feeder 3A is not shown in FIG. 3. In a state held in contact with the upper surface of the upper housing 22 (closed state), the automatic document feeder 3A automatically feeds a document sheet P to be copied toward a predetermined document reading position in the apparatus main body 2. On the other hand, when the user manually places a fixed document at the predetermined document reading position, the automatic document feeder 3A is opened upward (open state).

With reference to FIG. 2, the automatic document feeder 3A includes a main housing 30, a document feed tray 31, a document conveying unit 32 and a document discharge tray 33. The main housing 30 is a housing for housing various mechanisms provided in the automatic document feeder 3A. The main housing 30 includes a front wall portion 301 and a rear wall portion 302 raised upward on a left side part where the document conveying unit 32 is housed, and a substantially flat lower part on a right side part.

The document feed tray 31 is a tray on which a document sheet P to be fed to an image reading position is to be placed, and attached to the main housing 30 to extend from a feed opening 30H of the main housing 30. The document feed tray 31 includes a pair of cursors 311 for aligning the width of the placed document sheet P.

The document conveying unit 32 includes a conveyance path and a conveying mechanism for conveying a document sheet P on the document feed tray 31 to the document discharge tray 33 by way of the image reading position. The document conveying unit 32 includes an upper cover unit 32U to be fitted into an opening between the front wall portion 301 and the rear wall portion 302 of the main housing 30. These are described in detail later based on FIG. 4.

The document discharge tray 33 is a tray to which a document sheet P is to be discharged after a document image is optically read. The upper surface of the lower part on the right side of the main housing 30 serves as the document discharge tray 33.

Next, the internal structure of the apparatus main body 2 is described based on FIG. 3. Toner containers 99Y, 99M, 99C and 99Bk, an intermediate transfer unit 92, an image forming station 93, an exposure unit 94 and the above sheet feeding device 211 are successively housed from top in the lower housing 21.

The image forming station forms an image on a sheet based on an image read by the image reading apparatus 3. The image forming station 93 includes four image forming units 10Y, 10M, 10C and 10Bk for forming respective toner images of yellow (Y), magenta (M), cyan (C) and black (Bk) to form a full-color toner image. Each of the image forming units 10Y, 10M, 10C and 10Bk includes a photoconductive drum 11 and a charger 12, a developing device 13, a primary transfer roller 14 and a cleaning device 15 arranged around the photoconductive drum 11.

The photoconductive drum 11 rotates about its shaft and an electrostatic latent image and a toner image are formed on the circumferential surface thereof. A photoconductive drum using an amorphous silicon (a-Si) based material can be used as the photoconductive drum 11. The charger 12 uniformly charges the circumferential surface of the photoconductive drum 11. The charged circumferential surface of the photoconductive drum 11 is exposed to light by the exposure unit 94 to form an electrostatic latent image.

The developing device 13 supplies toner to the circumferential surface of the photoconductive drum 11 to develop an electrostatic latent image formed on the photoconductive drum 11. The developing device 13 is for two-component developer and includes agitating rollers 16, 17, a magnetic roller 18 and a developing roller 19. The agitating rollers 16, 17 charge the toner by conveying the two-component developer in a circulating manner while agitating it. A two-component developer layer is carried on the circumferential surface of the magnetic roller 18 and a toner layer formed by the transfer of the toner to the circumferential surface of the developing roller 19 due to a potential difference between the magnetic roller 18 and the developing roller 19 is formed on the circumferential surface of the developing roller 19. The toner on the developing roller 19 is supplied to the circumferential surface of the photoconductive drum 11 to develop the electrostatic latent image.

The primary transfer roller 14 forms a nip portion in cooperation with the photoconductive drum 11 by sandwiching an intermediate transfer belt 921 provided in the intermediate transfer unit 92, and primarily transfers a toner image onto the photoconductive drum 11 to the intermediate transfer belt 921. The cleaning device 15 cleans the circumferential surface of the photoconductive drum 11 after the transfer of the toner image.

The yellow toner container 99Y, the magenta toner container 99M, the cyan toner container 99C and the black toner container 99Bk are respectively for storing toner of a corresponding color and supply the toners of YMCBk colors to the developing devices 13 of the image forming units 10Y, 10M, 10C and 10Bk corresponding to the respective colors through unillustrated supply paths.

The exposure unit 94 includes various optical devices such as light sources, polygon mirrors, reflecting mirrors and deflecting mirrors and forms an electrostatic latent image by irradiating light based on image data of a document image to the circumferential surface of the photoconductive drum 11 provided in each of the image forming units 10Y, 10M, 10C and 10Bk.

The intermediate transfer unit 92 includes the intermediate transfer belt 921, a drive roller 922 and a driven roller 923. Toner images from a plurality of photoconductive drums 11 are superimposed on the intermediate transfer belt 921 (primary transfer). The superimposed toner images are secondarily transferred to a recording sheet supplied from the sheet feeding device 211 in a secondary transfer unit 98. The drive roller 922 and the driven roller 923 for driving and rotating the intermediate transfer belt 921 are rotatably supported on the lower housing 21.

The sheet feeding device 211 (41, 42) stores a sheet stack formed by stacking a plurality of recording sheets. A pickup roller 21 is arranged above the right end side of the sheet feeding device 211. By driving the pickup roller 212, the uppermost sheet of a sheet stack in the sheet feeding device 211 is picked up one by one and carried into a carry-in conveyance path 26. On the other hand, a recording sheet manually placed on the sheet feed tray 43 is carried into the carry-in conveyance path 26 by driving a conveyor roller 45 of the sheet feeding unit 44.

A conveyance path 28 extending up to the discharge opening 961 by way of the secondary transfer unit 98 and a fixing unit 97 and a sheet discharge unit 96 to be described later is provided downstream of the carry-in conveyance path 26. An upstream part of the conveyance path 28 is formed between an inner wall formed on the lower housing 21 and an inner wall forming the inner side surface of a reversing unit 29. Note that the outer side surface of the reversing unit 29 forms one side of a reversing conveyance path 291 for reversing and conveying a sheet in printing both sides of the sheet. A pair of registration rollers 27 are arranged upstream of the secondary transfer unit 98 in the conveyance path 28. A sheet is temporarily stopped at the pair of registration rollers 27 and sent out to the secondary transfer unit 98 at a predetermined timing for image transfer after a skew correction is made.

The fixing unit 97 and the sheet discharge unit 96 are housed in the coupling housing 23. The fixing unit 97 includes a fixing roller and a pressure roller and applies a fixing process by heating and pressing a recording sheet having a toner image secondarily transferred thereto in the secondary transfer unit 98. The recording sheet with the fixed color image is discharged toward the internal sheet discharge portion 24 through the discharge opening 961 by the sheet discharge unit 96 arranged downstream of the fixing unit 97.

The image reading unit 3B is arranged in the upper housing 22 (first housing). The image reading unit 3B includes a contact glass 222 (transparent member), a CIS unit 224 (reading unit) and an image processing unit 225. The contact glass 222 faces a document sheet P being automatically fed from the automatic document feeder 3A and a fixed document placed on the upper surface thereof with a document surface faced down and serves as a reading surface for reading images of these documents. The contact glass 222 is arranged in the upper housing 22 to face the automatic document feeder 3A in such a manner as to include a document reading position X to be described later and a reading area B to be described later which is adjacent to the document reading position X and where a fixed document is placed on the upper surface of the contact glass 222 with a document surface faced down.

The CIS unit 224 optically reads document information of the document sheet P and the fixed document. The CIS unit 224 extends in forward and backward directions (main scanning direction) and is made movable in a lateral direction (arrow L of FIG. 3, sub scanning direction) along a conveying direction of the document sheet P by an unillustrated moving unit. The CIS unit 224 reads the image of the document sheet P or the fixed document through the contact glass 222 at the document reading position X and in the reading area B. The CIS unit 224 includes unillustrated LED light source, GRIN (Graded-Index) lenses and CIS (Contact Image Sensor), wherein the CIS is arranged to face the contact glass 222. Reflected light from the document illuminated by the LED light source is photoelectrically converted by the linearly arranged CIS via the GRIN lenses arranged in an array to read the image of the document. Image data of the document image photoelectrically converted by the CIS is sent to the image processing unit 225. The image processing unit 225 performs various image processings on the image data according to a reading condition of the document image and then sends the processed imaged data to the exposure nit 94.

Next, the internal structure of the automatic document feeder 3A is described in detail based on FIG. 4. FIG. 4 is a sectional view of the document conveying unit 32 that is an essential part of the automatic document feeder 3A. The document conveying unit 32 includes first to third conveyance paths 341 to 343 (document conveyance path) which serve as a conveyance path for document sheets P, a first conveyor roller pair 351 and a second conveyor roller pair 352 arranged at appropriate positions of these first to third conveyance paths 341 to 343, and a document feeding unit 5 for feeding the document sheets P placed on the document feed tray 31 into the document conveying unit 32.

The first, second and third conveyance paths 341, 342 and 343 form a U-shaped sheet conveyance path extending from the feed opening 30H described above up to a sheet discharge opening 30E through which the document sheet P is to be discharged to the document discharge tray 33 by way of the optical document reading position X (first position) for an image of the document being conveyed. Specifically, the first, second and third conveyance paths 341, 342 and 343 are arranged in the automatic document feeder 3A and convey a document through the document reading position X on the upper housing 22 facing the automatic document feeder 3A in the closed state.

The first conveyance path 341 is a conveyance path connected to the document feed tray 31 and extending slightly obliquely downward to the left to the first conveyor roller pair 351 from the feed opening 30H while having a substantially arcuate shape. The first conveyance path 341 is a conveyance path along which the document sheet P sent out from the document feeding unit 5 first passes. An upper conveying surface of this first conveyance path 341 is defined by a first guide member 355 arranged in a unit housing 320 of the upper cover unit 32U.

The second conveyance path 342 is an arcuate conveyance path extending from a downstream end of the first conveyance path 341 to a position facing a contact surface guide 36 forming the document reading position X. Note that the contact surface guide 36 is arranged to face the contact glass 222 (FIG. 3) and forms the document reading position X between itself and the contact glass 222. A lower conveying surface of the second conveyance path 342 is defined by an arcuate second guide member 361 and an upper conveying surface of the second conveyance path 342 is defined by an arcuate third guide member 362 arranged to face the second guide member 361.

The third conveyance path 343 is a conveyance path extending slightly obliquely upward to the right from the position facing the contact surface guide 36 to the sheet discharge opening 30E. An entrance side of the third conveyance path 343 is defined by a document discharge guide 63 to be described later arranged on the contact glass 222 and a fourth guide member 363 arranged to face the document discharge guide 63 from above.

The document feeding unit 5 is arranged at an entrance side of the first conveyance path 341. Further, the document feeding unit 5 is assembled on the lower surface of the upper cover unit 32U. The document feeding unit 5 includes a holder 50 for supporting each component, a pickup roller 51, a document feed roller 52 arranged downstream of and at a predetermined distance from the pickup roller 51 in the sheet conveying direction, and an idler gear 57 for drive transmission between the pickup roller 51 and the document feed roller 52.

The pickup roller 51 is driven and rotated by an unillustrated driving unit to send the document sheet P placed on the document feed tray 31 to the first conveyance path 341. As shown in FIG. 4, a facing pad 313 is arranged at a position facing the pickup roller 51 at a downstream end of the document feed tray 31 of the main housing 30. The pickup roller 51 is rotated in a direction of an arrow D1 by an unillustrated rotating unit to come into contact with the document sheet P. Then, a nip portion A1 where the document sheet P is to be nipped is formed between the pickup roller 51 and the facing pad 313.

The document feed roller 52 is driven and rotated by an unillustrated driving unit to convey document sheets P sent out from the pickup roller 51 downward one by one to the first conveyance path 341. As shown in FIG. 4, a separation pad 350 is arranged to face the document feed roller 52 from below in the main housing 30. A spring member 350a for pressing the separation pad 350 upward is arranged below the separation pad 350. A nip portion B1 is formed between the document feed roller 52 and the separation pad 350 by a pressing force of the spring member 350a.

Each of the first and second conveyor roller pairs 351, 352 includes a drive roller 351A, 352A for generating a rotational drive force for conveying a document sheet P and a driven roller 351B, 352B held in contact with the drive roller 351A, 352A to rotate following the rotation of the drive roller.

The first conveyor roller pair 351 is arranged between the first and second conveyance paths 341, 342 and feeds a document sheet P sent out from the document feeding unit 5 toward the document reading position X. The second conveyor roller pair 352 is arranged at an end of the third conveyance path 343 to feed the document sheet P finished with a reading operation at the document reading position X through the sheet discharge opening 30E to the document discharge tray 33.

Figure 5:
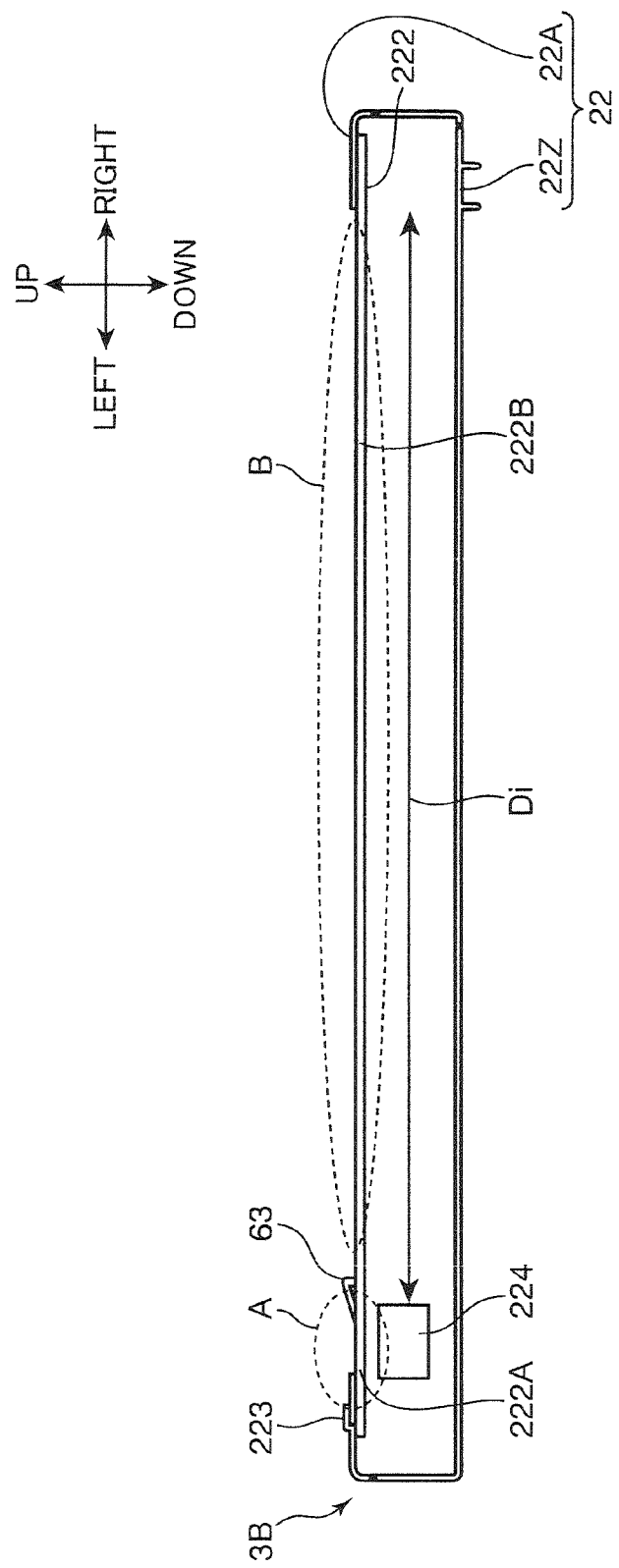
FIG. 5 is a sectional view showing an image reading unit according to the one embodiment of the present disclosure.
Figure 6:
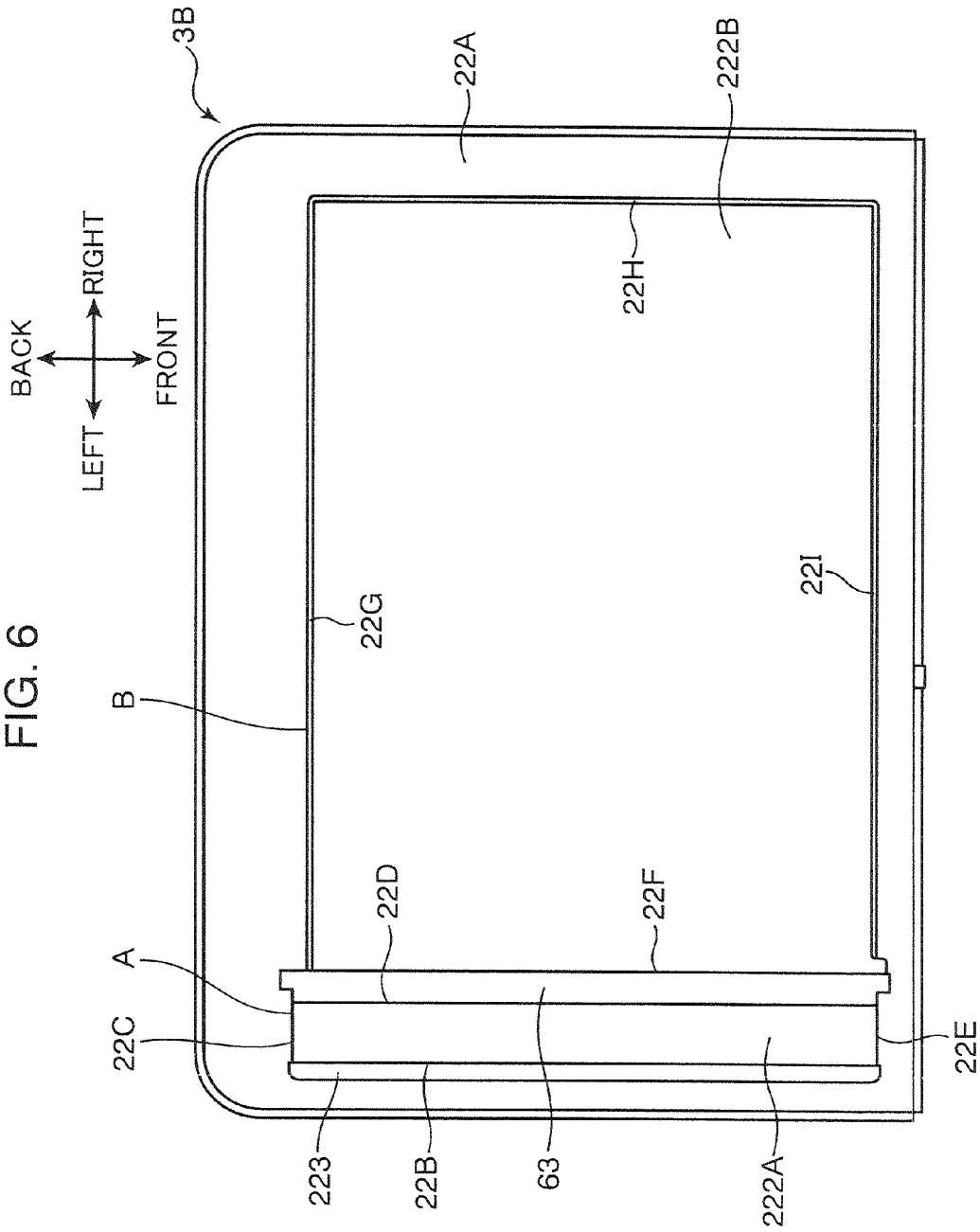
FIG. 6 is a plan view showing the image reading unit according to the one embodiment of the present disclosure.
Figure 7:
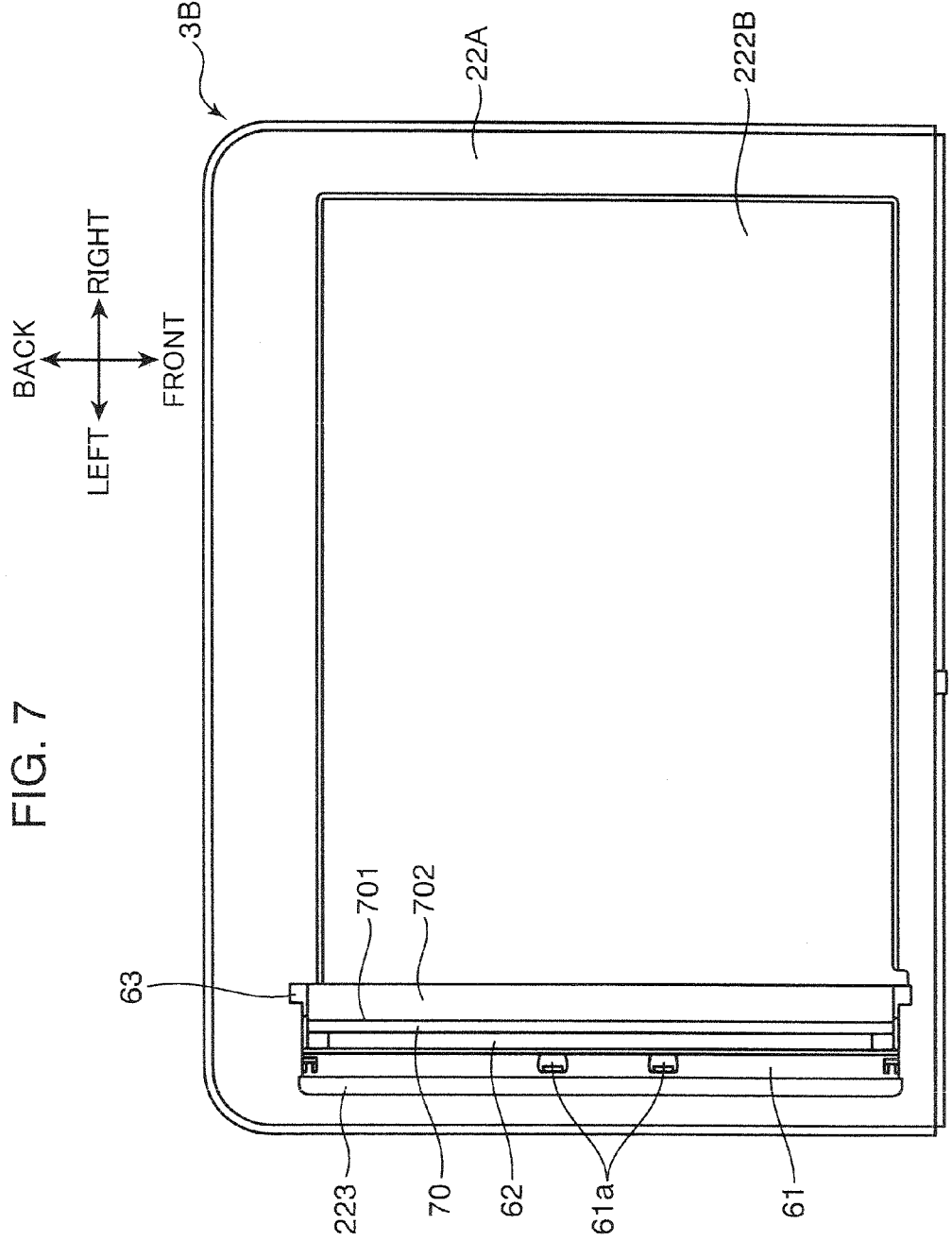
FIG. 7 is a plan view showing the image reading unit according to the one embodiment of the present disclosure.
Figure 8:
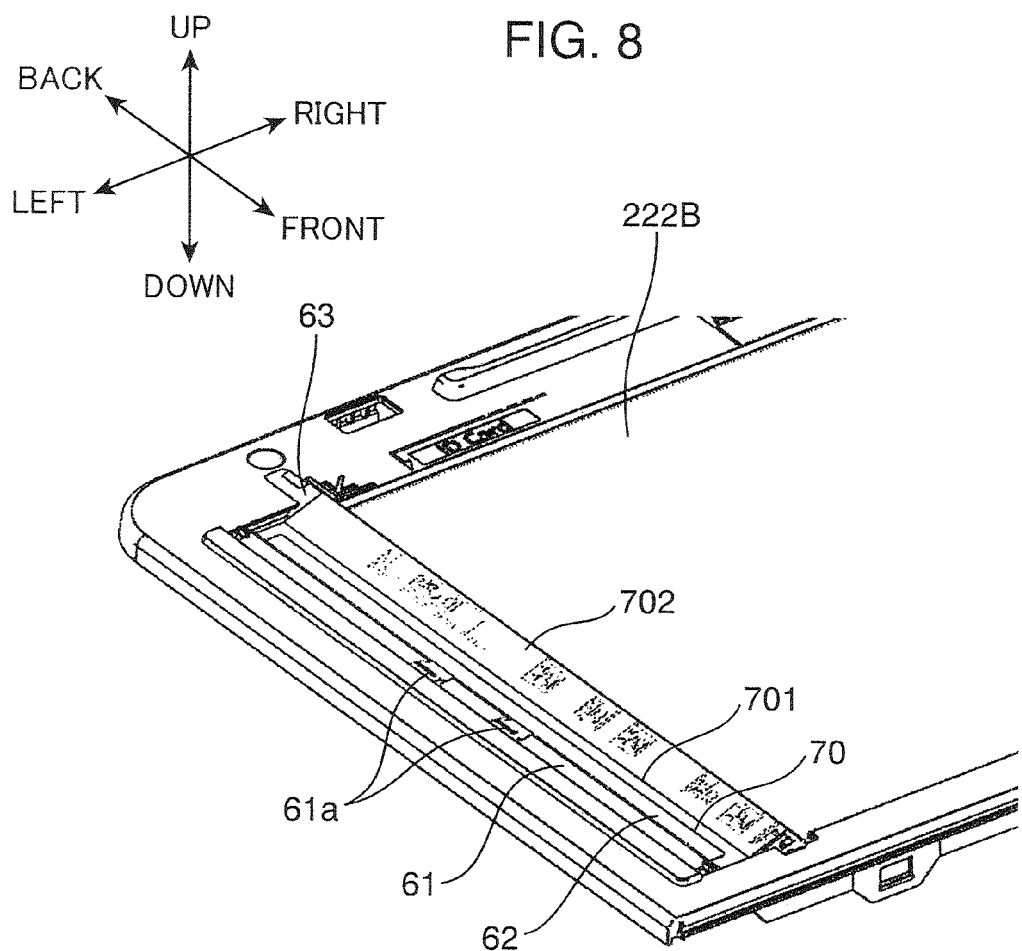
FIG. 8 is an enlarged perspective view showing a part of the image reading unit according to the one embodiment of the present disclosure.
Figure 9:
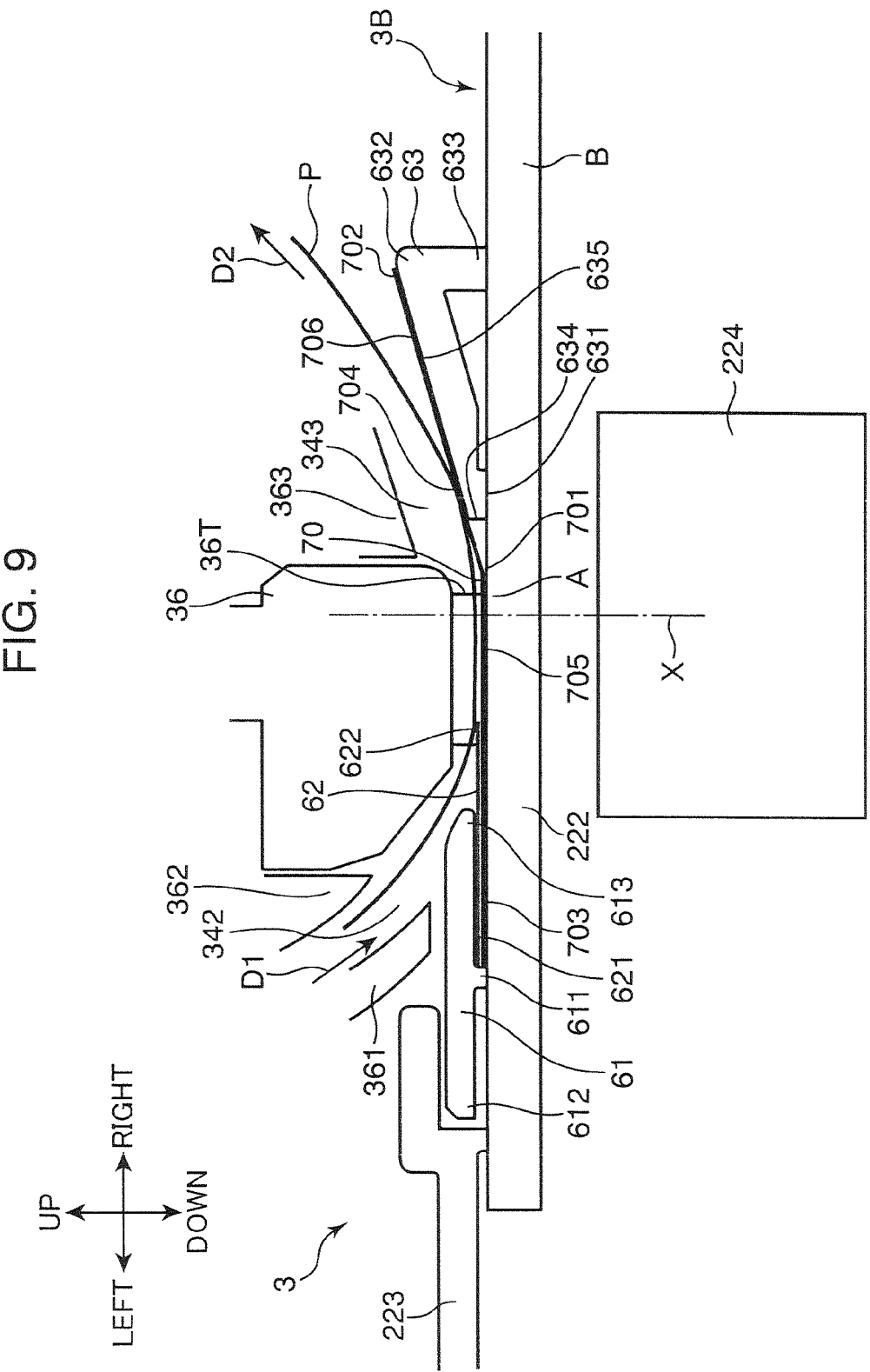
FIG. 9 is an enlarged sectional view showing an essential part of an image reading apparatus according to the one embodiment of the present disclosure.

Next, the configuration of the image reading unit 3B according to this embodiment is described with reference to FIGS. 5 to 9. FIG. 5 is a sectional view showing the image reading unit 3B according to the embodiment of the present disclosure, and FIGS. 6 and 7 are plan views showing the image reading unit 3B. FIG. 6 shows a state where a sheet holder 61, a conveyance guide sheet 62 and a transparent sheet 70 to be described later are removed from a state of FIG. 7. FIG. 8 is a perspective view of the image reading unit 3B of FIG. 7. Further, FIG. 9 is an enlarged sectional view showing a configuration around the document reading position X formed between the automatic document feeder 3A and the image reading unit 3B.

With reference to FIG. 5, the image reading unit 3B is housed in the upper housing 22. The upper housing 22 (first housing) includes an upper frame 22A, a lower frame 22Z, the document discharge guide 63 (guide member) and a side frame 223. An upper part of the upper housing 22 is defined by the upper frame 22A and a lower part thereof is defined by the lower frame 22Z. Specifically, the box-shaped upper housing 22 is formed by assembling the upper and lower frames 22A, 22Z.

With reference to FIG. 6, the upper frame 22A is formed with two openings, which are open upward, as reading areas A and B, respectively. A boundary between the reading areas A and B is defined by the document discharge guide 63 to be described later. The reading area A is an area including the document reading position X (first position) where an image of a document sheet P being conveyed by the automatic document feeder 3A is read, and the reading area B (second position) is an area where an image of a fixed document placed on the contact glass 222 is read. The reading area A is formed on the left end of the upper frame 22A to be long and narrow in forward and backward directions, and four sides thereof are defined by an 11th opening side 22B, a 12th opening side 22C, a 13th opening side 22D and a 14th opening side 22E. On the other hand, the reading area B is formed to the right of, at a predetermined distance from and adjacent to the reading area A. The reading area B is formed to extend from the vicinity of the right side of the reading area A to the vicinity of the right end of the upper frame 22A. Four sides of the reading area B are defined by a 21st opening side 22F, a 22nd opening side 22G, a 23rd opening 22H and a 24th opening side 22I.

With reference to FIGS. 5 and 6, the contact glass 222 (transparent member) is inserted from the underside of the upper frame 22A and fixedly arranged in the upper frame 22A to close the reading areas A and B from below. In this embodiment, the contact glass 222 is a single glass plate. A part 222A of the contact glass 222 arranged in the reading area A faces a document sheet P conveyed by the automatic document feeder 3A and a fixed document is placed on the upper surface of a part 222B of the contact glass 222 arranged in the reading area B (second position) with a document surface faced down. The CIS unit 224 is arranged to be movable between the reading area A and the right end of the reading area B in the sub scanning direction by an unillustrated moving unit as indicated by arrows Di of FIG. 5 to read these document images.

The document discharge guide 63 (guide member) is arranged on the contact glass 222 at a side downstream of the document reading position X in the conveying direction of the document sheet P and guides the document sheet P to a downstream side of the third conveyance path 343 in the conveying direction. The document discharge guide 63 is a part of the upper frame 22A and arranged on the upper surface of the upper frame 22A by manufacturing the upper frame 22A by integral molding. The document discharge guide 63 corresponds to the boundary between the reading areas A and B and the $13^{th}$ and $21^{st}$ opening sides 22D, 22F are formed by side edges of the document discharge guide 63. With reference to FIG. 9, the document discharge guide 63 includes a first guide leg portion 631 and a second guide leg portion 633 standing from the upper surface of the contact glass 222 and arranged at a distance from each other in the lateral direction, and a guide slope portion 635. The first guide leg portion 631 is a wall portion arranged to stand from the upper surface of the contact glass 222 at the side of the reading area A and the second guide leg portion 633 is a wall portion arranged to stand from the upper surface of the contact glass 222 at the side of the reading area B. The second guide leg portion 633 is arranged to be taller than the first guide leg portion 631. The guide slope portion 635 connects the first and second guide leg portions 631, 633. The guide slope portion 635 is a flat portion extending from a guide front wall 634 of the first guide leg portion 631 and inclined at a predetermined angle to be more distant (in an upward direction) from the contact glass 222 toward the second guide leg portion 633. The guide slope portion 635 intersects with the second guide leg portion 633 on a guide top portion 632.

The side frame 223 is part of the upper frame 22A and arranged on the upper surface of the upper frame 22A by manufacturing the upper frame 22A by integral molding. The side frame 223 is located at the left end of the reading area A and has a function of protecting a sheet holder 61 to be described later.

With reference to FIGS. 7 to 9, the image reading unit 3B includes the transparent sheet 70 (transparent sheet member), the conveyance guide sheet 62 (first pressing member) and the sheet holder 61 in the reading area A.

In FIG. 9, the document reading position X (first position) where the CIS in the CIS unit 224 reads a document is arranged substantially at a lateral central position of the reading area A. Further, the second and third conveyance paths 342, 343 in the automatic document feeder 3A described above are arranged above the reading area A. Specifically, a document sheet P is conveyed from an upper left side along the second conveyance path 342, passes through the document reading position X on the contact glass 222 and is conveyed toward an upper right side along the third conveyance path 343.

The transparent sheet 70 is a transparent thin sheet member. In this embodiment, a PET film having a thickness of 0.2 mm is used as a material of the transparent sheet 70. Note that another transparent sheet material can be adopted as the transparent sheet 70. In this case, the thickness of the transparent sheet 70 is preferably set in a range of 0.1 mm to 0.4 mm. The transparent sheet 70 includes a first sheet portion 705 and a second sheet portion 706. The first sheet portion 705 is arranged on the contact glass 222 to cover the document reading position X from an upstream side to a downstream side in the conveying direction of the document sheet P. The second sheet portion 706 is connected to a downstream side of the first sheet portion 705 in the conveying direction and held in contact with the guide slope portion 635 of the document discharge guide 63 to extend along the guide slope portion 635. The first sheet portion 705 is arranged in close contact with the upper surface of the contact glass 222. Further, the transparent sheet 70 includes a bent portion 701 between the first and second sheet portions 705, 706. The bent portion 701 is arranged downstream of the first sheet portion 705 in the conveying direction. Specifically, a part of the transparent sheet 70 upstream of the bent portion 701 in the conveying direction of the document sheet P is the first sheet portion 705 and a part of the transparent sheet 70 downstream of the bent portion 701 in the conveying direction of the document sheet P is the second sheet portion 706. Further, an antireflection treatment is applied to surfaces of the first and second sheet portions 705, 706 of the transparent sheet 70 facing the contact glass 222.

The conveyance guide sheet 62 is arranged upstream of the document reading position X in the conveying direction of the document sheet P. The conveyance guide sheet 62 is a transparent thin sheet member similar to the transparent sheet 70. The same type of material as the transparent sheet 70 is used for the conveyance guide sheet 62. The conveyance guide sheet 62 is arranged to cover a part of the first sheet portion 705 upstream of the document reading position X in the conveying direction from above and has a function of pressing the first sheet portion 705 toward the contact glass 222. A guide sheet leading end portion 622 of the conveyance guide sheet 62 which is a downstream end portion in the conveying direction and arranged near the document reading position X is arranged to enter the second conveyance path 342 upstream of the document reading position X in the conveying direction. Thus, the document sheet P being conveyed along the second conveyance path 342 moves toward the document reading position X while being held in contact with the guide sheet leading end portion 622.

The sheet holder 61 is arranged on the contact glass 222 at a side upstream of the transparent sheet 70 and the conveyance guide sheet 62 in the conveying direction of the document sheet P. The sheet holder 61 is a plate-like member having a slight height and substantially T-shaped in a lateral cross-section. The sheet holder 61 includes a holder supporting portion 611 arranged to stand from the upper surface of the contact glass 222 and a holder base end portion 612 and a holder leading end portion 613 respectively extending in the lateral direction from the holder supporting portion 611. The holder base end portion 612 is covered from above by the side frame 223. Specifically, the sheet holder 61 is protected by the side frame 223 so that the user cannot touch the holder base end portion 612, whereby the inclination of the sheet holder 61 to the left about the holder supporting portion 611 is suppressed. Further, the holder leading end portion 613 supports to sandwich a transparent sheet base end portion 703 on an upstream side of the first sheet portion 705 of the transparent sheet 70 in the conveying direction and a guide sheet base end portion 621 on an upstream side of the conveyance guide sheet 62 in the conveying direction between itself and the contact glass 222. As shown in FIGS. 7 and 8, fastening portions 61a are arranged at two positions in a central part of the sheet holder 61 in forward and backward directions. The transparent sheet 70 and the conveyance guide sheet 62 are integrally fixed by these fastening portions 61a and the separation thereof from the reading area A is suppressed. Note that since the inclination of the sheet holder 61 about the holder supporting portion 611 is suppressed by the side frame 223, the holder leading end portion 613 supporting the conveyance guide sheet 62 and the transparent sheet 70 is prevented from lifting upward.

Next, functions achieved in the reading area A in this embodiment are described. The document sheet P fed by the document feeding unit 5 (FIG. 4) of the automatic document feeder 3A is carried into the second conveyance path 342 from the first conveyance path 342 (arrow D1 of FIG. 9). Then, the document sheet P being conveyed toward the document reading position X along the second conveyance path 342 comes into contact with the guide sheet leading end portion 622 of the conveyance guide sheet 62 (FIG. 9). At this time, a moving direction of the document sheet P is changed from an oblique downward direction to the right to a substantially horizontal direction. Thus, the document sheet P is conveyed in the substantially horizontal direction above the document reading position X. Then, a document image of the document sheet P passing through the document reading position X is read by the CIS unit 224. The document sheet P having passed through the document reading position X comes into contact with a transparent sheet contact portion 704 of the second sheet portion 706 held in contact on the document discharge guide 63. At this time, the moving direction of the document sheet P is changed from the substantially horizontal direction to an oblique upward direction to the right. The document sheet P having come into contact with the transparent sheet contact portion 704 is further conveyed downward along the third conveyance path 343 (arrow D2 of FIG. 9) and discharged to the document discharge tray 33 through the sheet discharge opening 30E.

As just described, in this embodiment, the document sheet P being conveyed through the document reading position X from the upstream side to the downstream side in the conveying direction comes into contact with the guide sheet leading end portion 622 at a position upstream of the document reading position X. Further, the document sheet P comes into contact with the transparent sheet contact portion 704 at a position downstream of the document reading position X. Since the document sheet P being conveyed from the guide sheet leading end portion 622 toward the transparent sheet contact portion 704 is conveyed in the substantially horizontal direction, the contact of the document sheet P with the first sheet portion 705 of the transparent sheet 70 is suppressed. Thus, at the document reading position X, the document sheet P is less likely to come into contact with the first sheet portion 705 of the transparent sheet 70 and, even in the event of contact, the transparent sheet 70 is less likely to be scratched due to a low contact pressure. Further, the first sheet portion 705 of the transparent sheet 70 is not rubbed by the document sheet P and is restrained from being scratched. As a result, noise images are less likely to be included in an image read by the CIS unit 224 due to the scratch.

Further, in this embodiment, the conveyance guide sheet 62 has the function of pressing the first sheet portion 705 toward the contact glass 222 at the side upstream of the document reading position X in the conveying direction. Thus, the first sheet portion 705 is less likely to lift upward from the contact glass 222 and the contact thereof with the document sheet P is suppressed. Further, since an air layer (clearance) is less likely to be formed between the first sheet portion 705 and the contact glass 222, focusing performance of the CIS unit 224 is stably maintained. Further, reflected light brought by the CIS unit 224 is less likely to interfere at a boundary between the air layer and the transparent sheet 70, which prevents interference fringes from being included in the read image. As a result, a good image based on the read image is formed in the image forming station 93.

Figure 10:
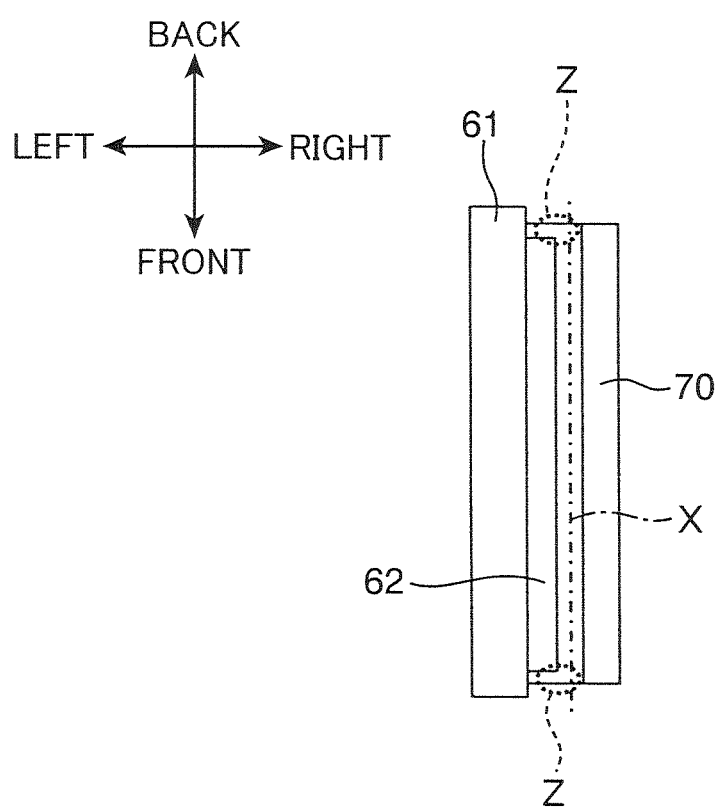
FIG. 10 is a schematic plan view showing a relationship between the lengths of a conveyance guide sheet and a transparent sheet.

Furthermore, in this embodiment, projections 36T (second pressing member) for pressing the transparent sheet 70 toward the contact glass 222 are arranged in addition to the conveyance guide sheet 62. FIG. 10 is a diagram showing a relationship between the lengths of the conveyance guide sheet 62 and the transparent sheet 70 in forward and backward directions (main scanning direction) in this embodiment. Further, FIG. 11 is a perspective view of the contact surface guide 36 and FIG. 12 is a perspective view enlargedly showing one end of the contact surface guide 36.

With reference to FIG. 10, opposite end portions of the conveyance guide sheet 62 are arranged inwardly of opposite end portions of the transparent sheet 70. As a result, areas Z where the transparent sheet 70 is singly exposed upward are present outwardly of the conveyance guide sheet 62 (see FIG. 10). As a result, the exposed parts of the transparent sheet 70 can be directly pressed toward the contact glass 222.

Figure 11:
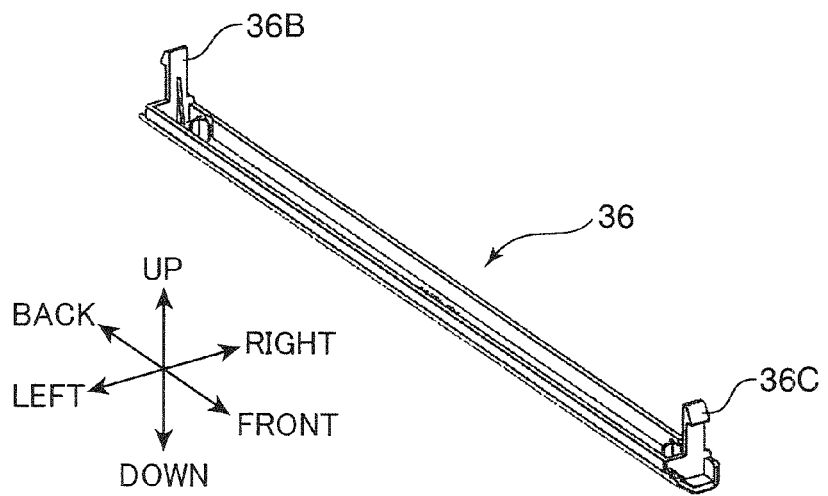
FIG. 11 is a perspective view of a contact surface guide according to the one embodiment of the present disclosure.
Figure 12:
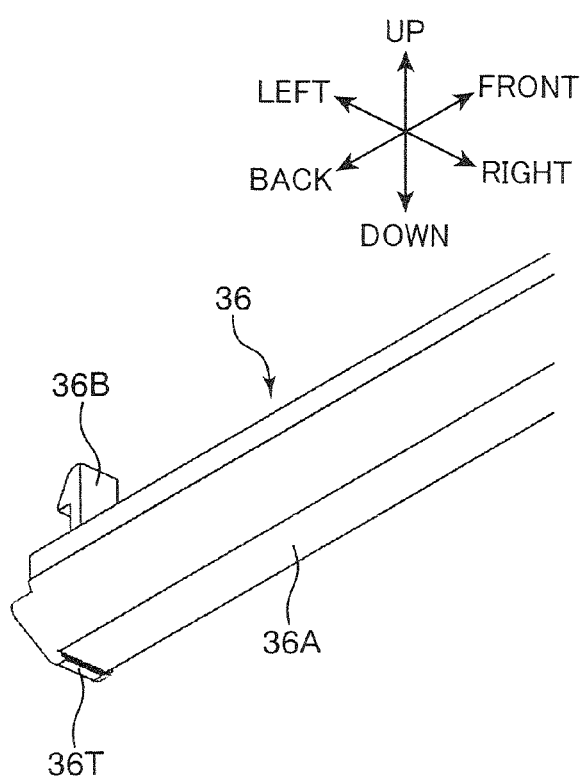
FIG. 12 is a perspective view enlargedly showing a part of the contact surface guide according to the one embodiment of the present disclosure.

Further, with reference to FIGS. 11 and 12, the contact surface guide 36 includes a facing surface 36A, a first fixing portion 36B, a second fixing portion 36C and the projections 36T. The contact surface guide 36 is a guide member extending in the main scanning direction while facing the document reading position X in the automatic document feeder 3A and has a function of guiding the document sheet P to the document reading position X above the reading area A as shown in FIG. 9. At this time, the facing surface 36A of the contact surface guide 36 is arranged to face the document reading position X. The first and second fixing portions 36B, 36C are projecting pieces projecting upward at opposite end parts of the contact surface guide 36 and mounted into unillustrated insertion holes arranged in the document conveying unit 32. The projections 36T project downward from opposite end parts of the facing surface 36A. Note that only one projection 36T is shown in FIG. 12.

The projections 36T project toward the areas Z of the transparent sheet 70 from the facing surface 36A of the contact surface guide 36 as shown in FIG. 10. Specifically, when the automatic document feeder 3A is closed with respect to the upper housing 22, the projections 36T bias the areas Z of the transparent sheet 70 at the outer sides of the end portions of the conveyance guide sheet 62 in the main scanning direction toward the contact glass 222. Thus, the transparent sheet 70 is directly pressed against the contact glass 222. Therefore, the transparent sheet 70 is arranged in close contact with the contact glass 222 and a clearance (air layer) is even less likely to be formed between the transparent sheet 70 and the contact glass 222. Furthermore, since the transparent sheet 70 is stably pressed against the contact glass 222, it is preferably suppressed that the transparent sheet 70 is scratched by a document being conveyed above the transparent sheet 70.

As just described, in addition to the conveyance guide sheet 62, the projections 36T directly press the transparent sheet 70 against the contact glass 222. If a small air layer is formed between the contact glass 222 and the transparent sheet 70, reflected light generated at a boundary between the contact glass 222 and the air layer and reflected light generated at a boundary between the air layer and the transparent sheet 70 may interfere and a pattern of interference fringes may be included in a read image. Thus, the formation of interference fringes in a read image of the CIS unit 224 is further suppressed by having the above configuration. Further, even if the CIS unit 224 that generally has a narrow depth of field is used, the position of the transparent sheet 70 is stably maintained, whereby the position where document sheets P are read becomes stable and preferred read images can be obtained.

Further, in this embodiment, the bent portion 701 is formed between the first and second sheet portions 705, 706 of the transparent sheet 70 so that the first sheet portion 705 is held in close contact with the contact glass 222. The postures of the first and second sheet portions 705, 706 are made less likely to be affected and the first sheet portion 705 is kept in close contact with the contact glass 222 by the bent portion 701. Particularly, even if the second sheet portion 706 comes into contact with the document discharge guide 63, the first sheet portion 705 upstream of the bent portion 701 in the conveying direction is held in close contact with the contact glass 222 and less likely to lift from the contact glass 222. Therefore, a problem caused by the formation of a clearance is prevented more as described above.

Further, the bent portion 701 is arranged between the first and second sheet portions 705, 706. The projections 36T of the contact surface guide 36 reliably bias the areas Z of the first sheet portion 705 of the transparent sheet 70 outward of the conveyance guide sheet 62 in the main scanning direction toward the contact glass 222. Since this causes the first sheet portion 705 upstream of the bent portion 701 in the conveying direction to be biased downward, the lift of the second sheet portion 706 from the document discharge guide 63 is suppressed. Further, even if the first sheet portion 705 is biased by the projections 36T, the second sheet portion 706 is held in close contact with the guide slope portion 635 and the lift of the transparent sheet leading end portion 702 from the document discharge guide 63 is suppressed.

Note that, as described above, the antireflection treatment is applied to the surfaces of the first and second sheet portions 705, 706 of the transparent sheet 70 facing the contact glass 222. By applying the antireflection treatment to the surfaces of the transparent sheet 70 facing the contact glass 222, even if a clearance is formed between the contact glass 222 and the transparent sheet 70, light interference is suppressed and it is further prevented that a pattern of interference fringes is included in a read image.

Further, in this embodiment, the transparent sheet base end portion 703 and the guide sheet base end portion 621 are integrally supported by the holder leading end portion 613 at the side upstream of the transparent sheet 70 and the conveyance guide sheet 62 in the conveying direction. Thus, the close contact of the first sheet portion 705 with the contact glass 222 and the entrance position of the guide sheet leading end portion 622 into the second conveyance path 342 are stably maintained.

Although the image reading apparatus 3 and the image forming apparatus 1 according to this embodiment have been described above, the present disclosure is not limited to these and can be, for example, embodied as follows.

(1) Although the projections 36T have been described to be used as members for biasing the areas of the transparent sheet 70 outward of the conveyance guide sheet 62 in the main scanning direction toward the contact glass 222 in the above embodiment, the present disclosure is not limited to this. Instead of the projections 36T, other members for pressing the end portions of the transparent sheet 70 toward the contact glass 222 may be arranged in the upper housing 22.

(2) Although the document discharge guide 63 has been described to be integrally arranged to the upper frame 22A in the above embodiment, there is no limitation to this. Specifically, the document discharge guide 63 may be fixed as another member to the upper frame 22A.

(3) Although the bent portion 701 is formed between the first and second sheet portions 705, 706 in the transparent sheet 70 in the above embodiment, there is no limitation to this. If the close contact of the first sheet portion 705 with the contact glass 222 and the contact surface of the second sheet portion 706 with the document discharge guide 63 are stably ensured, similar effects are achieved even in other modes. For example, the second sheet portion 706 may be fixed over a predetermined width to the document discharge guide 63 using a double-faced adhesive tape or the like.

(4) Although a document image of a document sheet P has been described to be read by the CIS unit 224 at the document reading position X in the above embodiment, there is no limitation to this. Various reading units including reduction and contact optical systems may be adopted as the reading unit for reading document images.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image reading apparatus, comprising:
a first housing;
a second housing openable and closable with respect to the first housing;
a document conveyance path arranged in the second housing and configured to convey a document so that the document passes through a first position on the first housing facing the second housing in a closed state;
a transparent plate arranged in the first housing to face the second housing, the transparent plate including the first position and a second position adjacent to the first position and reconfigured to receive a fixed document placed on an upper surface of the transparent plate with a document surface of the fixed document faced toward the transparent plate;
a reading unit extending in a main scanning direction intersecting with a conveying direction of the document in the first housing, the reading unit being movable in a sub scanning direction along the conveying direction of the document and configured to read an image of the document conveyed along the conveyance path passed the first position and to read the fixed document through the transparent plate at the second position;
a guide member arranged on the transparent plate at a side downstream of the first position in the conveying direction of the document and configured to guide the document to a downstream side of the document conveyance path in the conveying direction;
a transparent sheet member arranged on the transparent plate to cover the first position from an upstream side to a downstream side in the conveying direction; and
a first pressing member on a side of the transparent sheet member opposite the transparent plate and upstream of the first position in the conveying direction, the first pressing member being configured to press the transparent sheet member toward the transparent plate;
wherein an end portion of the first pressing member is arranged inwardly of an end portion of the transparent sheet member in the main scanning direction.

2. An image reading apparatus according to claim 1, further comprising:
a second pressing member configured to bias an area of the transparent sheet member at an outer side of the end portion of the first pressing member in the main scanning direction toward the transparent plate.

3. An image reading apparatus according to claim 2, further comprising:
a document guiding member extending in the main scanning direction while facing the first position in the second housing and configured to guide the document to the first position;
wherein the second pressing member is a projection projecting toward the area of the transparent sheet member from the document guiding member.

4. An image reading apparatus according to claim 2, wherein:
the transparent sheet member includes:
a first sheet portion which is arranged on the transparent plate to cover the first position from the upstream side to the downstream side in the conveying direction, and
a second sheet portion which is held in contact with the guide member to extend along the guide member and with which the document being conveyed along the document conveyance path comes into contact; and
a downstream end portion of the first pressing member in the conveying direction is arranged to enter a part of the document conveyance path upstream of the first position in the conveying direction.

5. An image reading apparatus according to claim 4, wherein:
the transparent sheet member includes a bent portion arranged downstream of the first sheet portion in the conveying direction;
a part of the transparent sheet member upstream of the bent portion in the conveying direction is the first sheet portion;
a part of the transparent sheet member downstream of the bent portion in the conveying direction is the second sheet portion; and
the bent portion is so bent that the first sheet portion is held in close contact with the transparent plate.

6. An image reading apparatus according to claim 4, wherein:
the second pressing member biases the area of the first sheet portion outward of the first pressing member.

7. An image reading apparatus according to claim 1, wherein:
an antireflection treatment is applied to a surface of the transparent sheet member facing the transparent plate.

8. An image reading apparatus according to claim 1, further comprising:
a supporting member configured to support an upstream end portion of the transparent sheet member in the conveying direction and an upstream end portion of the first pressing member in the conveying direction.

9. An image reading apparatus according to claim 1, wherein:
the reading unit includes a contact image sensor arranged to face the transparent plate.

10. An image forming apparatus, comprising:
an image reading apparatus; and
an image forming station configured to form an image on a sheet based on an image read by the image reading apparatus;
the image reading apparatus including:
a first housing;
a second housing openable and closable with respect to the first housing;
a document conveyance path arranged in the second housing and configured to convey a document so that the document passes through a first position on the first housing facing the second housing in a closed state;
a transparent plate arranged in the first housing to face the second housing, the transparent plate including the first position and a second position adjacent to the first position and configured to receive a fixed document placed on an upper surface of the transparent plate with a document surface of the fixed document faced toward the transparent plate;
a reading unit extending in a main scanning direction intersecting with a conveying direction of the document in the first housing, the reading unit being movable in a sub scanning direction along the conveying direction of the document and configured to read an image of the document conveyed along the conveyance path passed the first position and to read the fixed document through the transparent plate at second position;
a guide member arranged on the transparent plate at a side downstream of the first position in the conveying direction of the document and configured to guide the document to a downstream side of the document conveyance path in the conveying direction;
a transparent sheet member arranged on the transparent plate to cover the first position from an upstream side to a downstream side in the conveying direction; and
a first pressing member on a side of the transparent sheet member opposite the transparent plate and upstream of the first position in the conveying direction, the first pressing member being configured to press the transparent sheet member toward the transparent plate;
wherein an end portion of the first pressing member is arranged inwardly of an end portion of the transparent sheet member in the main scanning direction.

11. An image forming apparatus according to claim 10, further comprising:
a second pressing member configured to bias an area of the transparent sheet member at an outer side of the end portion of the first pressing member in the main scanning direction toward the transparent plate.

12. An image forming apparatus according to claim 11, further comprising:
a document guiding member extending in the main scanning direction while facing the first position in the second housing and configured to guide the document to the first position;
wherein the second pressing member is a projection projecting toward the area of the transparent sheet member from the document guiding member.

13. An image forming apparatus according to claim 11, wherein:
the transparent sheet member includes:
a first sheet portion which is arranged on the transparent plate to cover the first position from the upstream side to the downstream side in the conveying direction, and
a second sheet portion which is held in contact with the guide member to extend along the guide member and with which the document being conveyed along the document conveyance path comes into contact; and
a downstream end portion of the first pressing member in the conveying direction is arranged to enter a part of the document conveyance path upstream of the first position in the conveying direction.

14. An image forming apparatus according to claim 13, wherein:
- the transparent sheet member includes a bent portion arranged downstream of the first sheet portion in the conveying direction;
- a part of the transparent sheet member upstream of the bent portion in the conveying direction is the first sheet portion;
- a part of the transparent sheet member downstream of the bent portion in the conveying direction is the second sheet portion; and
- the bent portion is so bent that the first sheet portion is held in close contact with the transparent plate.

15. An image forming apparatus according to claim 14, wherein:
- the second pressing member biases the area of the first sheet portion outward of the first pressing member.

16. An image forming apparatus according to claim 10, wherein:
- an antireflection treatment is applied to a surface of the transparent sheet member facing the transparent plate.

17. An image forming apparatus according to claim 10, further comprising:
- a supporting member configured to support an upstream end portion of the transparent sheet member in the conveying direction and an upstream end portion of the first pressing member in the conveying direction.

18. An image forming apparatus according to claim 10, wherein:
- the reading unit includes a contact image sensor arranged to face the transparent plate.

* * * * *